March 25, 1924.
A. KIKTA
AUTOMOBILE DOOR LOCK
Filed Sept. 20, 1921
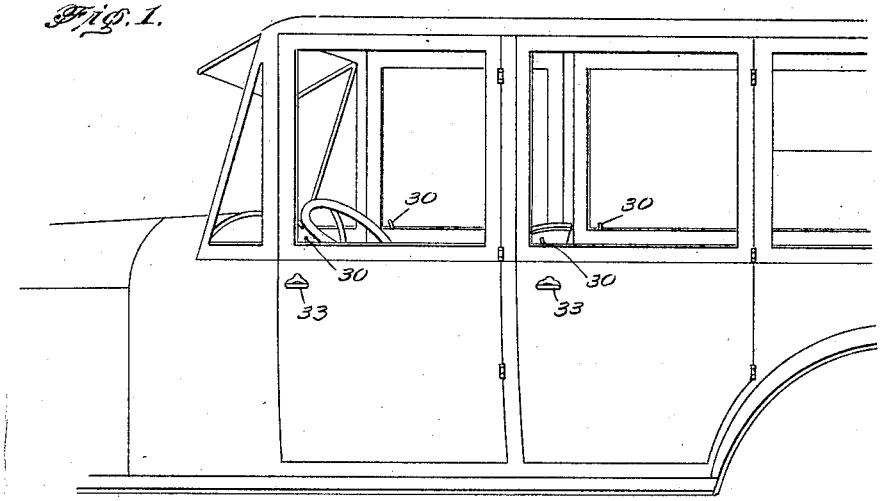
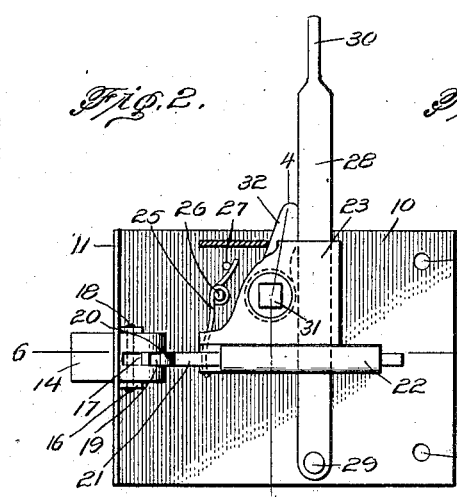
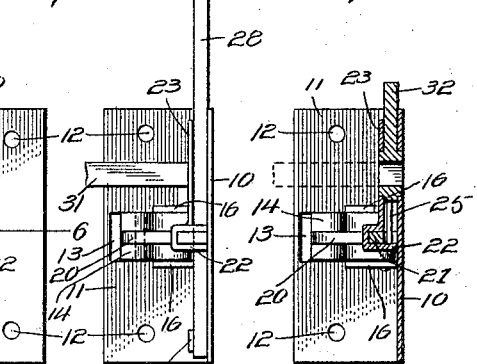
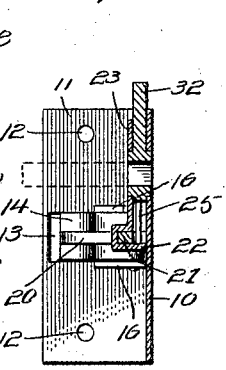
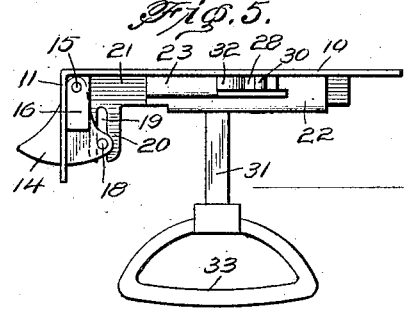
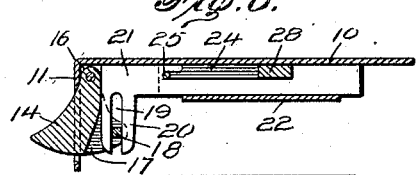
A. Kikta. INVENTOR.
BY
Geo. P. Kimmel
ATTORNEY.

Patented Mar. 25, 1924.

1,488,350

UNITED STATES PATENT OFFICE.

ALEX KIKTA, OF FLINT, MICHIGAN.

AUTOMOBILE DOOR LOCK.

Application filed September 20, 1921. Serial No. 501,870.

*To all whom it may concern:*

Be it known that I, ALEX KIKTA, a citizen of Russia, residing at Flint, in the county of Genesee and State of Michigan, have invented certain new and useful Improvements in Automobile Door Locks, of which the following is a specification.

This invention appertains to certain improvements in automobile door locks and has for its principal object to provide for a type of the same whereby to facilitate the release of the lock from the outside of an automobile as well as from the inside thereof, such as will be of extreme value in and convenient for effecting the opening and closing movements of a door, especially when the side curtains of an open type of automobile are in use, or when the automobile is of a closed type thereof.

With the foregoing and other objects in view, the invention resides in the certain novel and useful construction and arrangement of parts as will be hereinafter more fully described, set forth in the appended claim, and illustrated in the accompanying drawing, in which:—

Figure 1 is a fragmentary side elevation of the body of an automobile and showing the application of the preferred embodiments of the locks to the doors thereof, Figure 2 is a side elevation, partly in section, of one of the locks per se, Figure 3 is a rear end elevation thereof, Figure 4 is a vertical section taken on the line 4—4 of Figure 2, Figure 5 is a plan view of the top edge of the same, and Figure 6 is a longitudinal section taken on the line 6—6 of Figure 2.

Referring to the drawing, wherein similar characters of reference designate corresponding parts throughout the several views thereof, the numeral 10 indicates a lock plate having an angularly bent front end portion or lip 11 through the upper and lower corners of both parts of which are formed openings 12 for the reception of fastening screws or the like (not shown). The lip portion 11 is formed to provide a centrally disposed opening 13 through which is operable a latch member 14, pivotally mounted as at 15 in brackets 16, immediately inward of the opening 13 and in the corner of the latch plate at the point of connection of the lip portion 11 with the lock plate 10 thereof. The inner edge of the latch member 14 is bifurcated as at 17 and has a pin 18 spanning the bifurcations 17 for the engagement therewith of a slotway 19 formed in an angular extension 20 of an actuating member or bolt 21, which is slidably mounted on the longitudinal center of the inner face of the plate 10 and within a guide portion 22 formed with a casing 23, which casing 23 is secured on the inner face of the plate 10 and has its vertical wall spaced from the latter in a manner to enclose the operating devices of the lock mechanism.

The bolt 21 is slotted inwardly of its inner edge, as at 24, and for a distance intermediate its opposite ends, and the forward end of the slot is reduced and extending into the said reduced end of the slot 24 is one of the free ends of a spring 25 which is coiled at a medial point around a pin 26 and has its other free end bearing against a pin 27, the active end of the spring normally tensioning the bolt 21 in the forward direction of the plate 10 and in a manner to project the latch member 14 outwardly of the opening 13 of the lip portion 11, or in its operative position.

For actuating the bolt member 21 to release the latch 14 from its operative position, and from the inside of an automobile, a vertically disposed operating lever 28 is provided, and the same is pivoted at its lower end, as at 29, through the plate 10, and is passed upwardly of the casing 22 and through the slot 24 in the bolt member 21, the upper end portion thereof being projected above the top edge of the plate 10 and formed to provide a finger gripping portion 30 at its extreme upper end. In the use of the lock in this instance, by grasping the operating lever 28 and forcing the same in a rearward direction, the bolt 21 is moved in the same direction against the tension of the spring 25, and the latch member 14 is swung inwardly of the opening 13 of the lip portion 14 on the latch plate 10, when, upon releasing the lever 28, the spring 25 will act to return the parts to normal position, the outer end of the latch member 14 being of a configuration to adapt the same to readily seat itself in the keeper (not shown) cooperative therewith by the mere pushing or slamming of the door to its closed position.

For actuating the bolt member 21 and the latch member 14 to released position from the exterior of an automobile, a spindle 31, formed of a suitable length of metal bar strap, preferably square in cross section, is inserted in an opening formed in the vertical wall of the casing 23 to one side of the operating lever 28 and carries on its inner end an arm or finger 32, which is arranged to bear against the adjacent side edge of the latter, and acts to force the same in the same direction and manner as when the lever 28 is manipulated from its finger grip 30. The outer end portion of the spindle 31 is of a length to project outwardly of the outer wall of the door in which the lock is mounted, after the fashion now employed, and has secured thereon an operating handle 33 by means of which a turning movement may be readily imparted to the lever 28 and the bolt 21.

In Figure 1, an automobile is shown as when the locks have been installed in the doors thereof, and it will be seen that the finger grips 30 of the operating levers 28 project outwardly of the upper edges of the doors for a distance sufficient to admit of the ready manipulation of the same, while the spindles 31 are projected outwardly of the outer walls of the doors sufficiently for the securing thereon of the operating handles 33.

From the foregoing, it will be readily apparent that the invention provides for an extremely simple, inexpensive and durable form of automobile door lock, and one designed to overcome the manipulation of automobile locks from the inside or outside only, such as is extremely difficult, annoying and otherwise objectionable, especially in the case of an open car having its storm curtains fixed in position to enclose the interior of the same.

It will be readily understood that, while a preferred embodiment of the lock has been described and illustrated herein in specific terms and details of construction, arrangement and operation of parts, various changes in and modifications of the same may be resorted to without departing from the spirit of the invention or the scope of the claim appended hereto.

Having thus fully described the invention, what is claimed, is:—

In an automobile door lock a lock plate, a latch pivotally connected to one end thereof, a slidable flat locking bolt positioned against said plate and having one end pivotally connected to said latch whereby the latter is shifted when the bolt is operated, said bolt formed with a lengthwise slot having a reduced end, a spring carried by said plate above said bolt and having one end thereof extended into the reduced end of said slot, a casing secured to said plate and having its lower portion providing a guide for said bolt, a vertically disposed actuating member having its lower end pivoted to said plate below said bolt and extending up through said slot and above said plate and operable from the interior of an automobile for shifting the bolt to move the latch to released position, a spindle disposed at right angles to said member and mounted in said casing and plate above said bolt and operable from the exterior of the automobile, and an upwardly extending finger fixed to the spindle and bearing against said member whereby the latter is shifted to move the bolt to release the latch when the spindle is actuated to move the finger rearwardly.

In testimony whereof I affix my signature hereto.

ALEX KIKTA.